(No Model.)
P. M. & W. T. THURMAN.
DEVICE FOR REMOVING WAGON BODIES.
No. 316,851. Patented Apr. 28, 1885.
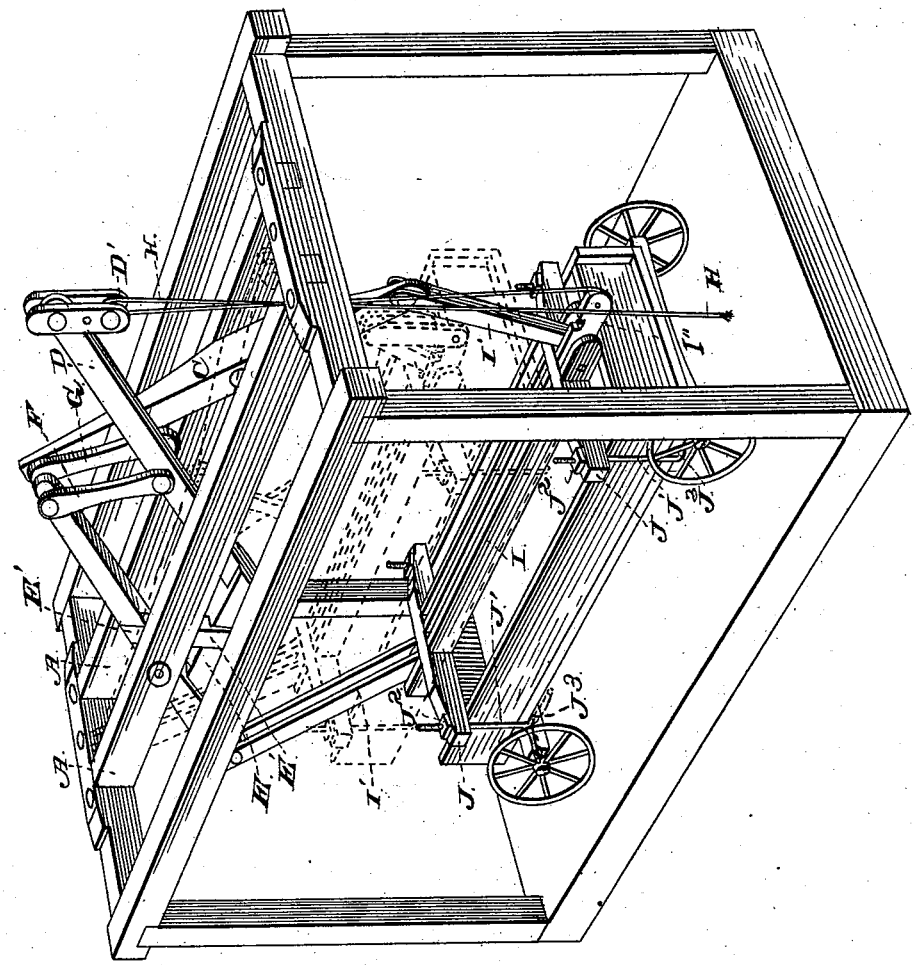
WITNESSES
W. L. McKenna
O. J. Adams
INVENTOR
P. M. Thurman
W. T. Thurman
by H. S. Snow & Co
att'ys

UNITED STATES PATENT OFFICE.

PLEASANT M. THURMAN AND WILLIAM T. THURMAN, OF CLARENCE, MO.

DEVICE FOR REMOVING WAGON-BODIES.

SPECIFICATION forming part of Letters Patent No. 316,851, dated April 28, 1885.

Application filed February 7, 1885. (No model.)

*To all whom it may concern:*

Be it known that we, PLEASANT M. THURMAN and WILLIAM T. THURMAN, citizens of the United States, residing at Clarence, in the county of Shelby and State of Missouri, have invented certain new and useful Improvements in Devices for Removing Wagon-Bodies, of which the following is a specification, reference being had to the accompanying drawings.

Our invention relates to wagon-body lifters, and it has for its object to provide a system of levers suitably connected with the wagon-body, and having their ends arranged adjacent each other, whereby they may be conveniently actuated by the same operating device. It has for a further object to provide convenient means for operating said lever. It has for further objects other improvements, all of which will be described.

To these ends the invention consists in certain novel construction, combination, and arrangement of parts, which will be hereinafter described and claimed.

In the drawing we have represented our invention in perspective.

In carrying out our invention we usually employ two parallel beams, A A', which may constitute a part of a special main frame, as shown, or may be a part of the framing of a barn or other outhouse. Levers B C are pivoted one to beam A and the other to beam A'. We prefer to so pivot the levers, because by such arrangement they are thrown into different vertical planes, and their long arms may readily pass each other; though it is manifest the levers might, when so desired, be pivoted to the same beam or other support without departing from the spirit of our invention. It will be noticed that the long arms of the lever extend toward each other, and the short ones project out in opposite directions. These short arms are connected in suitable manner, preferably as will be described, with the wagon-body.

A bar, D, is extended below and about parallel with the under side of the lever B. Its lower extremity is connected by beam E with said lever, and the beam E', braced in turn by bar $D^2$, as shown. The end of the long arm of the lever B is connected by a bar, F, with the bar D. The connections E F, it will be seen, serve to unite the bar D rigidly to the lever B, so that its motions will be imparted to said lever, and it is at the same time arranged below the extremity of the long arm of the lever C, so it may serve to properly operate same by means of a connecting-link, G, which is pivoted at one end to the lever C, and at its other end to the bar D. By depressing the upper end of bar D the short arms of both levers B and C will be raised together with the body connected therewith.

The bar D may be depressed by a rope, H, having one end fixed to the framing and carried over a pulley, D', suspended from bar D, with its other end hanging in convenient reach from the floor or ground, so it may be drawn on by the user; or the said bar may be depressed in any other manner desired.

The body-frame I is made about the length of the ordinary wagon-body, and is connected with levers C and B by bars I' I', pivoted at one end to the short arms of the levers and at their other ends to the ends of frame I.

Beams J J are arranged near the end of the frame I, and project laterally beyond the wagon-body K.

Clamps J' are made V-shaped, and have their shanks threaded and inserted upward through the beams J, and receive the nuts $J^2$, which turn down against the upper side of beams J. The arms $J^3$ of clamps J' are adapted to fit under and support the body when turned to the full-line position shown. In adjusting the clamps to the body, they are turned from the dotted position shown at right angles under the body, and the nuts $J^2$ are turned tightly down against the beams J, and the body is firmly clamped, when it may be readily raised from the running-gear, as before described.

It will be noticed that the body-frame has a slight extension, $I^2$, which is provided with a slot and perforation. This extension is adapted to enter the opening formed by the short arms, which are pivoted to upper end of bar D. These short arms are provided with a perforation similar to corresponding opening in extension I², by which means a bolt or pivot is inserted and the body-frame held securely in position.

By our invention the heavy bodies of farm, express, and other wagons may be easily removed by one man without danger of breaking or damaging the body.

The dotted lines represent the position of the several parts when the body has been lifted.

We claim—

1. In a wagon-body lifter, the combination of the levers B C, having their long arms extended toward each other, and their short arms projected out in opposite directions, together with means whereby to operate the long arms of the levers, substantially as set forth.

2. The combination of the levers B C, the bar D, connected rigidly with lever B, and the link G, connecting lever C and bar D, substantially as set forth.

3. In a wagon-body lifter, the combination of beams J, clamps J', having right-angled arms J³, and the nuts J², substantially as set forth.

4. The wagon-body lifter herein described, consisting of the levers B C, devices for operating said levers, the body-frame I, the connecting-bars I', the beams J, the clamps J', having arms J³, and the nuts J², substantially as set forth.

In testimony whereof we affix our signatures in presence of two witnesses.

PLEASANT M. THURMAN.
WILLIAM T. THURMAN.

Witnesses:
A. C. MALLORY,
ISAAC MINICK.